March 8, 1927.

F. G. WITHROW

SPRING OILER

Filed April 26, 1926

Inventor
Floyd G. Withrow
By Frank E. Liwrance, Jr.
Attorney.

March 8, 1927.

F. G. WITHROW

SPRING OILER

Filed April 26, 1926

Inventor
Floyd G. Withrow
By Frank E. Liverance, Jr.
Attorney.

Patented Mar. 8, 1927.

1,620,150

UNITED STATES PATENT OFFICE.

FLOYD G. WITHROW, OF GRAND RAPIDS, MICHIGAN.

SPRING OILER.

Application filed April 26, 1926. Serial No. 104,611.

This invention relates to oilers for leaf springs of the type used on motor vehicles and is particularly concerned with a very simple, economically constructed and effective securing device which may be used to hold an oil saturated member in contact with the spring. The retaining device is made from a single piece of wire and can be formed very quickly and economically and applied almost instantly. It is an object and purpose of the present invention to make a device of this character in the simple and effective manner hereafter described and which is particularldly valuable for the purposes for which it is designed.

An understanding of the invention may be had from the following description taken in connection with the accompanying drawings, in which, Fig. 1 is a perspective view showing the oiler of my invention applied to a leaf spring.

Like reference characters refer to like parts in the several figures of the drawings.

Figure 1:
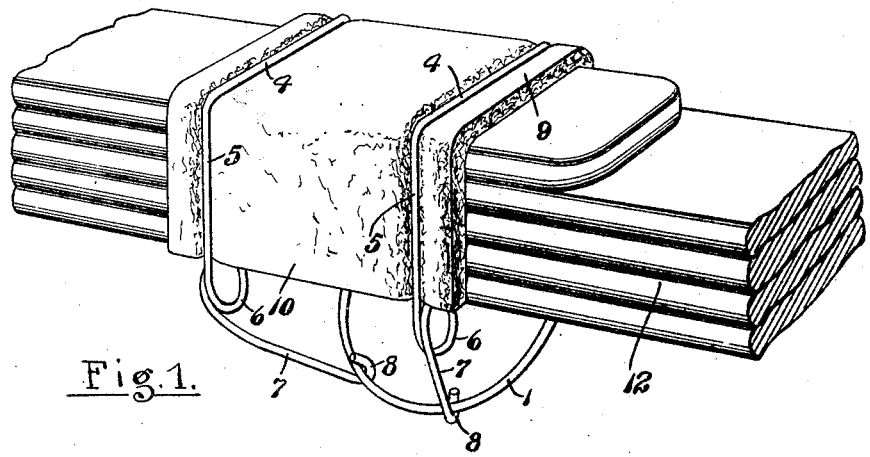

The retaining device which I have made is formed from a single piece of wire, bent at its middle point to form a curved loop 1 at each end of which the wire is formed into a single coil 2 and thence extends upwardly making the vertical sections 3, from which, at their upper ends, sections 4 are turned at right angles so as to lie horizontally, the sections 5 being bent downwardly from the sections 4 in a vertical direction parallel to the first vertical sections 3. Each of the sections 5 at its lower end is formed into a single coil 6 which lies in the same horizontal plane with the coils 2, previously described. After formation of these coils the ends of the wire are extended downwardly and inwardly toward the loop 1, as indicated at 7, each section 7 terminating in a hook 8.

The retaining device described is adapted to be applied to and over an oil absorption member which may be made of felt or equivalent fabric and which may be applied to the upper and lateral sides of a leaf spring. The felt or other material has an intermediate portion 9 lying against the upper leaf of the spring while the sides 10 thereof are bent downwardly to lie against the edges of the several leaves of the leaf spring, indicated at 12.

Figure 2:
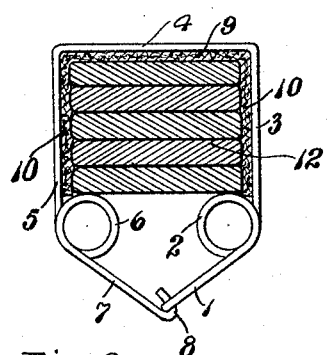
Fig. 2 is a vertical transverse section through the spring at one side of the oiler.

When the retaining device is placed over such oil absorbing member the horizontal sections 4 lie against the upper side of the intermediate part 9 and the vertical sections 3 and 5 lie against the outer sides of the downwardly extending portions 10. The coils 6 come underneath the lower side of the lowermost leaf of the leaf spring 12. Hooks 8 detachably engage with the loop 1 as shown in Figs. 1 and 2. When the hooks 8 are engaged with the loop 1 the coils at 6 and 2 are tensioned and the oil absorbing fabric is drawn snugly against the side edges of the leaves of the spring. Oil may be applied to the fabric member, such oil absorbing member being held snugly against the leaf spring and pressed against edges of the leaves so that oil will pass therefrom between the leaves and thus lubricate the spring.

Figure 5:
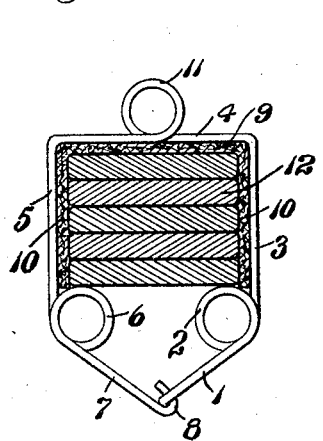
Fig. 5 is a view similar to Fig. 2 showing the retaining member of Fig. 4 used in holding the oil saturated member on the leaf spring.
Figure 4:
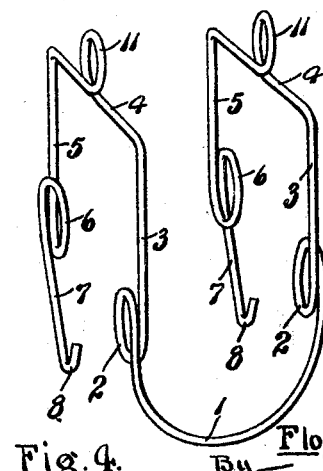
Fig. 4 is a similar perspective view of a slightly modified form of the retaining member.

In Figs. 4 and 5 a slight modification in the construction described is shown, in that in the upper sections 4 additional single coils 11 are made so that the same are tensioned when the device is applied to the spring, causing a spring pressure of the sections 3 and 5 against the sides 10 of the oil absorbing member, which pressure in the construction first described is less. The use of the coils 11 takes care of any variations in thickness of the fabric oil absorbing member and at the same time insures that the pressure against the lateral sides of the leaf spring shall be substantially uniform.

Figure 7:
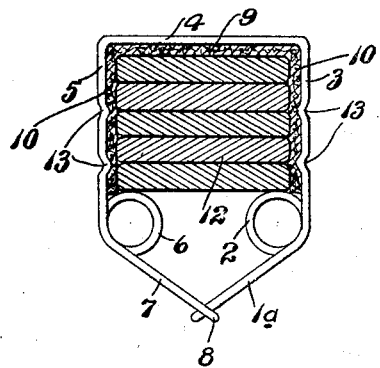
Fig. 7 is a view similar to Figs. 2 and 5 showing the application of the retaining member of Fig. 6 to a leaf spring.
Figure 6:
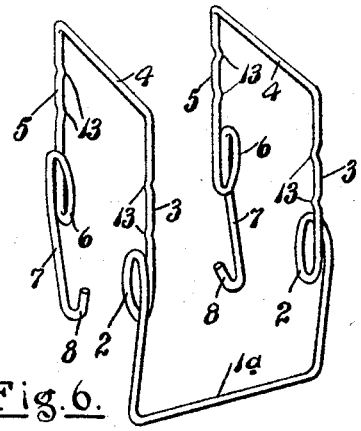
Fig. 6 is a perspective view similar to Figs. 3 and 4 showing a still further slight modification of said retaining member.

In Figs. 6 and 7 a further slight modification is shown in that the vertical sections 3 and 5 are formed with inwardly bent kinks 13 which may be made at intervals corresponding more or less to the horizontal planes between the various leaves of the leaf spring so as to press inwardly the sides 10 of the fabric oil absorbing member at such separation planes of the leaves. Also the loop 1 which has been shown as of curved form in Figs. 1 to 5, inclusive, is of slightly different form, as indicated at 1ª.

Figure 9:
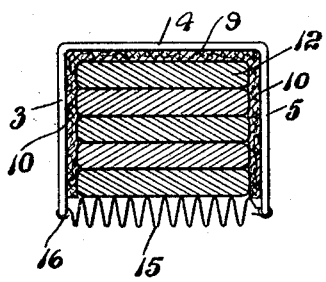
Fig. 9 is a sectional view like Figs. 2, 5 and 7, the retaining member shown in Fig. 8 being applied to a leaf spring
Figure 8:
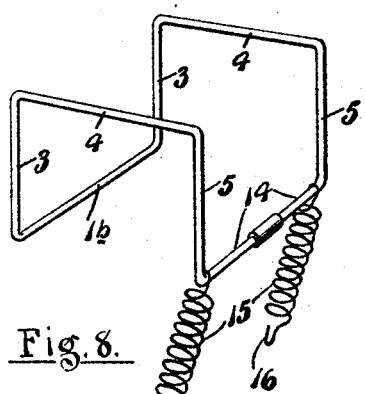
Fig. 8 is a perspective view of a still further modification of the retaining member.

In Figs. 8 and 9 a still further modification is shown, the structure being made from a single piece of wire having a lower horizontal section 1ᵇ, vertical sections 3 turned upwardly from the ends thereof, horizontal sections 4 turned from the upper ends of the sections 3 and vertical sections 5 turned downwardly from the end of the sections 4 and terminating in eyes 14. To each of these eyes a coiled spring 15 is connected at one end, each at its opposite end being formed with a hook 16 to detachably connect with the section 1ᵇ. It is evident that the oil absorbing fabric member may be retained on the leaf spring 12 with this construction, as shown in Fig. 9.

Figure 3:
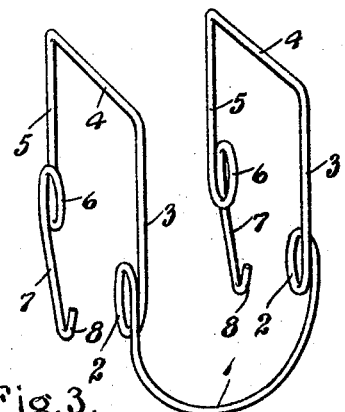
Fig. 3 is a perspective view of the retaining member of my invention.
Figure 10:
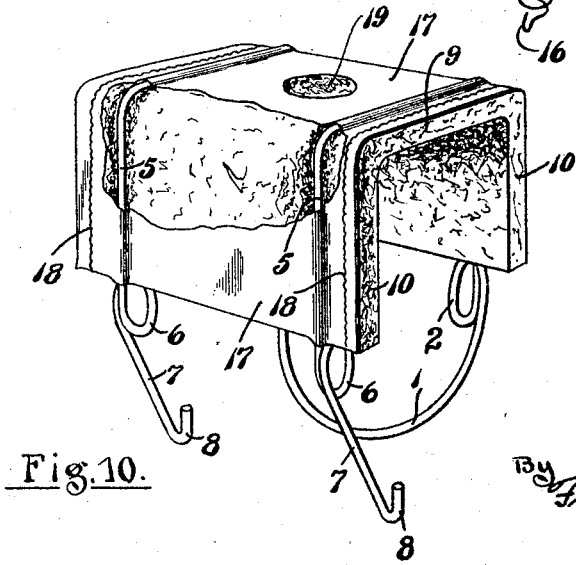
Fig. 10 is a perspective view of the construction shown in Figs. 1, 2 and 3 with a covering applied to the retaining device and the oil absorbing member associated therewith.

In Fig. 10 the construction shown in Figs. 1, 2 and 3 is equipped with a cover 17, preferably of oilcloth, which lies over the outer sides of the oil absorbing fabric and over the sections 3, 4 and 5 of the retaining member engaged thereagainst. It may be secured to the oil absorbing fabric member by stitching the same thereto as indicated at 18. The upper side of the covering 17 is provided with an opening at 19 so that oil may be applied directly to the upper section 9 of the oil absorbing member. This covers and protects the oil absorbing member against dust and dirt as is evident.

The embodiments shown are very simple, easily manufactured and yet are very effective for the purposes for which designed. The invention is defined in the appended claims and is to be considered comprehensive of all forms of structure coming within their scope.

I claim:

1. In combination with a leaf spring, a member of fabric located over the top and against the sides of the leaf spring, and a clamping member formed from a single piece of wire located over the fabric and having two sections spaced apart to clamp against said fabric, combined with means for connecting the lower ends of said clamping member together, said means extending underneath the leaf spring.

2. A device of the class described comprising an inverted U-shaped section of fabric, clamping means located over said fabric formed from a single piece of wire and including two spaced apart inverted U-shaped sections, the lower ends of the legs at one side of said sections being connected by an integral loop of wire and the lower ends of the other legs being extended downwardly and each terminating in a hook, substantially as described.

3. A construction containing the elements in combination defined in claim 2, combined with a cover located over the outer sides of and attached to said fabric section and also covering said U-shaped sections of the clamping member.

In testimony whereof I affix my signature.

FLOYD G. WITHROW.